United States Patent [19]

Runciman et al.

[11] 4,037,920
[45] July 26, 1977

[54] RADIATION SCANNING SYSTEM WITH TWO RELATIVELY MOVABLE REFLECTORS

[75] Inventors: Herbert Morrison Runciman; Peter John Berry, both of Glasgow, Scotland

[73] Assignee: Barr and Stroud Limited, Glasgow, Great Britain

[21] Appl. No.: 600,199

[22] Filed: July 29, 1975

[30] Foreign Application Priority Data

Oct. 26, 1974 United Kingdom ............... 46424/74

[51] Int. Cl.² .......................... G02B 27/17; H01J 3/16
[52] U.S. Cl. .......................................... 350/7; 250/236
[58] Field of Search ................... 350/7, 6, 285, 22, 26; 250/234–236; 178/7.6

[56] References Cited

U.S. PATENT DOCUMENTS

| | | | |
|---|---|---|---|
| 1,666,594 | 4/1928 | Clark | 178/7.6 |
| 2,070,460 | 2/1937 | Traub | 178/7.6 |
| 2,149,198 | 2/1939 | Traub | 178/7.6 |
| 2,262,136 | 11/1941 | Eisler | 178/7.6 |
| 3,705,755 | 12/1972 | Baer | 350/6 |
| 3,909,105 | 9/1975 | Neiswander et al. | 350/7 |

*Primary Examiner*—Jon W. Henry
*Attorney, Agent, or Firm*—Mason, Fenwick & Lawrence

[57] ABSTRACT

Apparatus for use in a radiation scanning system comprising a radiation detector and an optical system arranged to scan radiation from a field of view across the radiation detector. The optical system includes two sets of planar reflective surfaces, one set being movable relative to the other, and a rotary assembly carrying one of the sets and rotatable about an axis of rotation. The detector is arranged relative to the optical system such that the radiation enters the detector after sequential reflection from reflective surfaces of the two sets, and the surfaces which effect the sequential reflection being separated by a predetermined amount and being located with respect to the axis of rotation such that the angle of incidence of radiation at the detector is independent of the position of the radiation in the field of view.

5 Claims, 12 Drawing Figures

RADIATION SCANNING SYSTEM WITH TWO RELATIVELY MOVABLE REFLECTORS

This invention relates to apparatus for use in a radiation scanning system and in particular to different forms of optomechanical reflectors which are used in the optical and/or infra-red waveband.

According to the present invention there is provided apparatus for use in radiation scanning system comprising a radiation detector and optical means which is arranged to scan radiation from a field of view across said detector, said optical means including two sets of planar reflective surfaces of which one set is movable relative to the other, a rotary assembly carrying one of said set of planar reflective surfaces and rotatable about an axis of rotation, the detector being arranged relative to the optical means such that radiation enters the detector after sequential reflection from reflective surfaces of said two sets, the surfaces effecting said sequential reflection being separated by a predetermined amount and being located with respect to said axis of rotation of said rotary assembly such that the angle of incidence of radiation at the detector is independent of the position of the radiation in the field of view.

In one arrangement said rotary assembly consists of a first rotatable drum which is rotatable about a first axis of rotation and a second rotatable drum which is rotatable about a second axis of rotation and said two sets of planar reflective surfaces are mounted one on the first drum and one on the second drum, the drums being located and dimensioned to permit scanned radiation to enter the detector after sequential reflection from reflective surfaces of said two sets of planar reflective surfaces. Conveniently, said drums each have the same number of planar reflective surfaces and are arranged for synchronous rotation in the same direction. Alternatively, said drums have different numbers of planar reflective surfaces and are arranged for asynchronous rotation in the same direction.

In an alternative arrangement said rotary assembly consists of a single rotatable drum on which one of said two sets of planar reflective surfaces is mounted said one set consisting of two sequences of planar reflective surfaces, the other of said two sets of planar reflective surfaces consists of a stationary roof reflecting arrangement, the arrangement being such that radiation is scanned onto the detector after sequential reflection from one of said two sequences of planar reflective surfaces, said roof reflecting arrangement and the other of said two sequences of planar reflective surfaces. Conveniently, one of said two sequences of planar reflective surfaces is located on said drum at a different perpendicular distance from the axis of rotation thereof than is the other of said two sequences of planar reflective surfaces.

Embodiments of the present invention will now be described by way of example with reference to the accompanying drawings, in which:

FIG. 1 diagrammatically illustrates a first embodiment;

Figure 4:
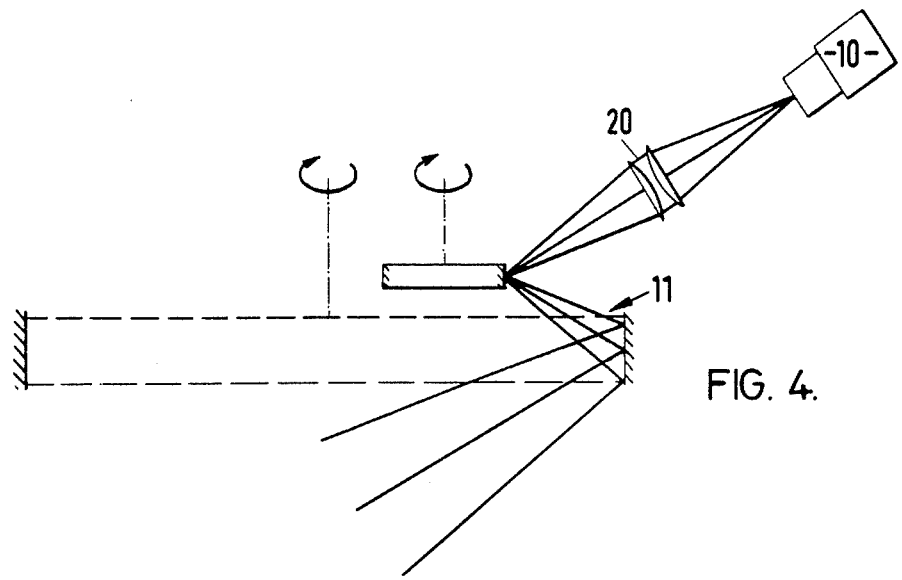
Figure 5:
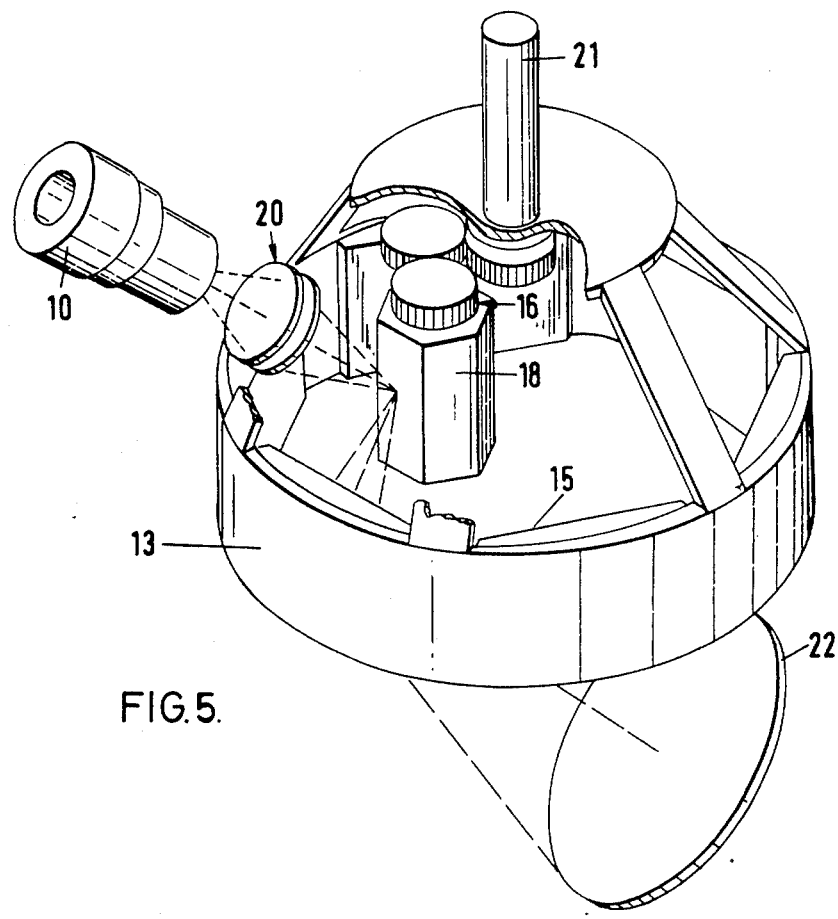
Figure 6:
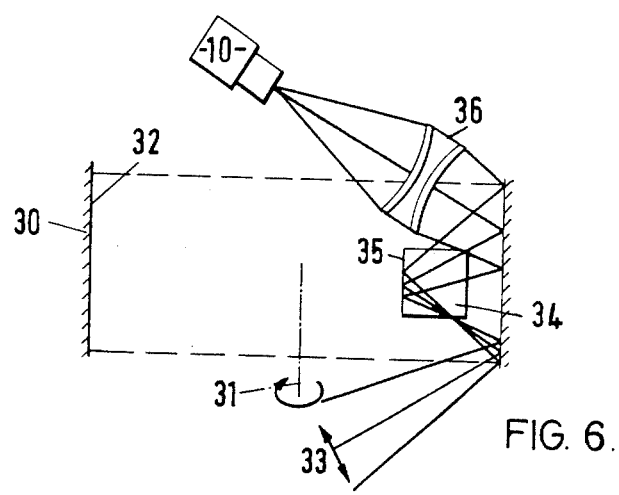
Figure 7:
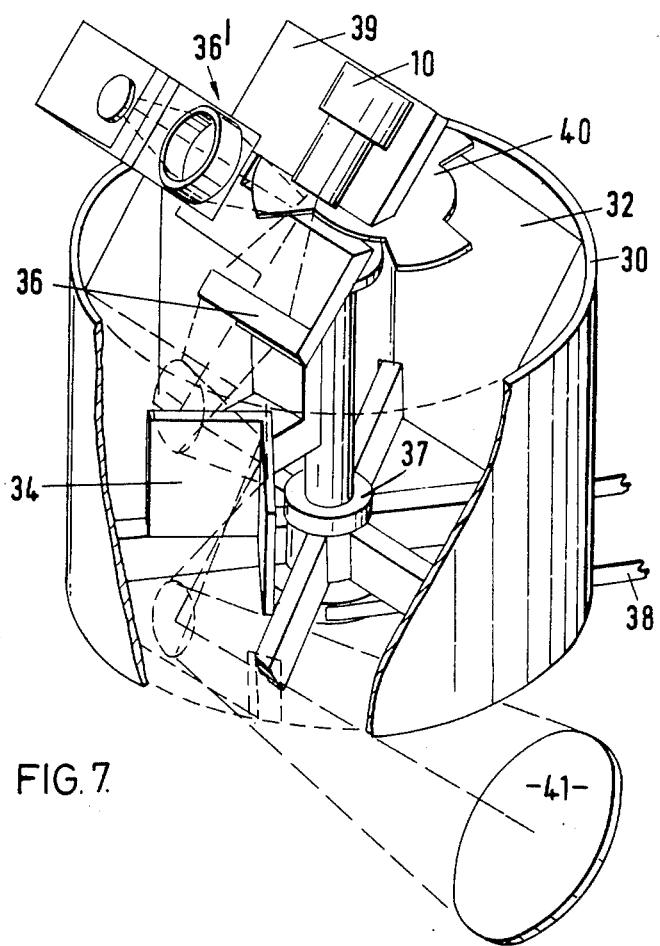
Figure 8:
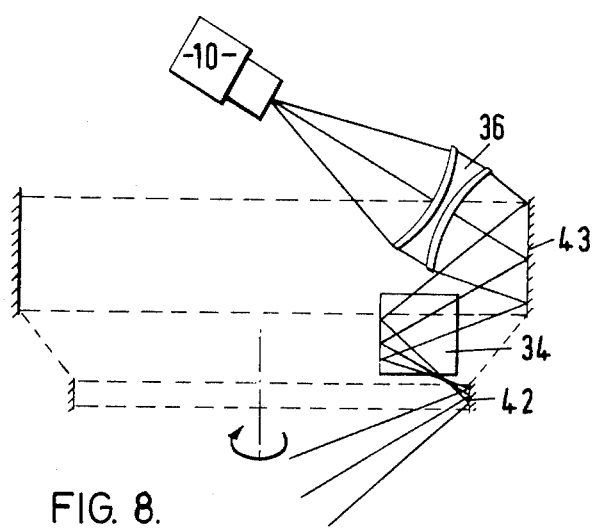
Figure 9:
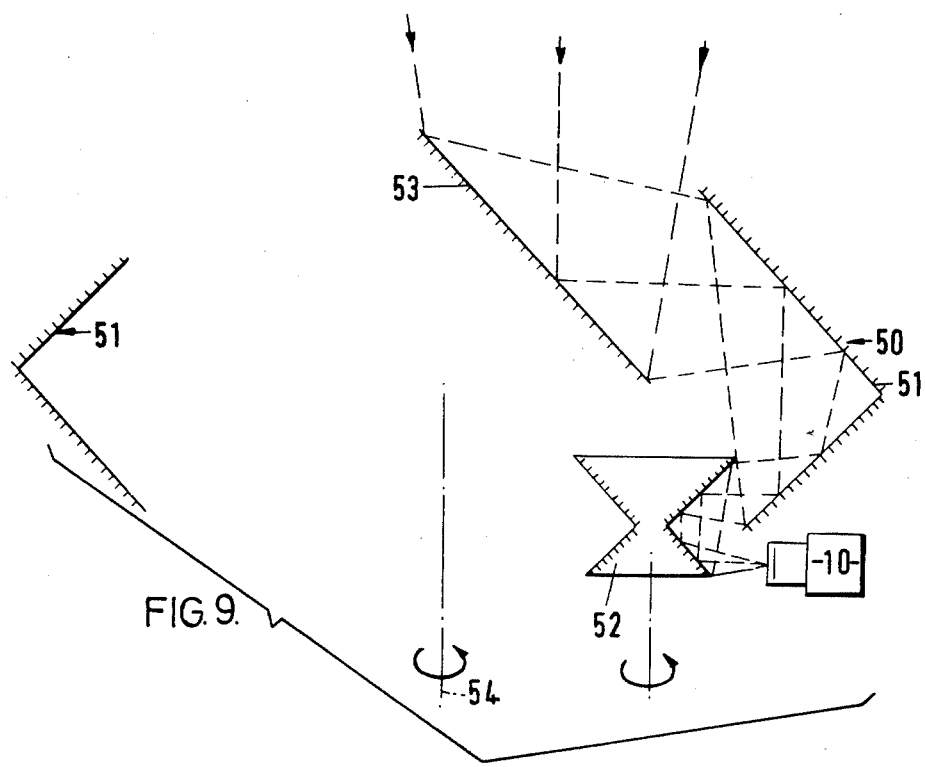
Figure 10:
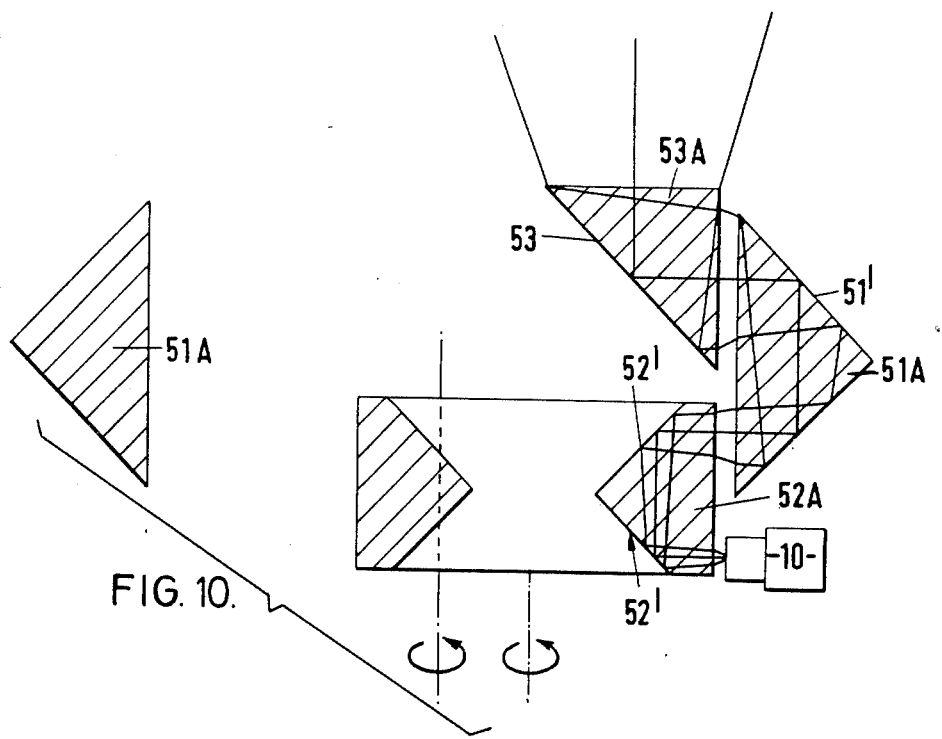
Figure 11:
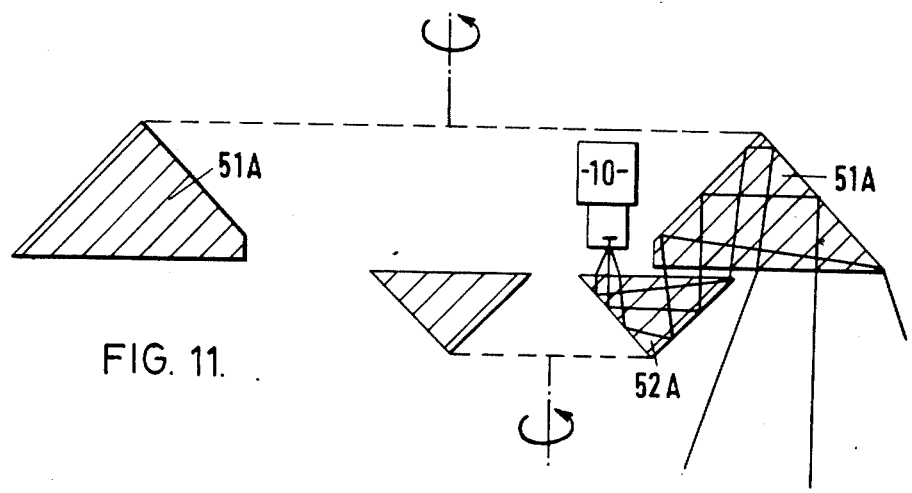

FIG. 4 diagrammatically illustrates a second embodiment;

FIG. 5 illustrates the second embodiment in greater detail;

FIG. 6 diagrammatically illustrates a third embodiment;

FIG. 7 illustrates the third embodiment in greater detail;

FIG. 8 diagrammatically illustrates a fourth embodiment;

FIG. 9 diagrammatically illustrates a fifth embodiment;

FIG. 10 illustrates a first modification of FIG. 9;

FIG. 11 illustrates a second modification of FIG. 9; and

Figure 12:
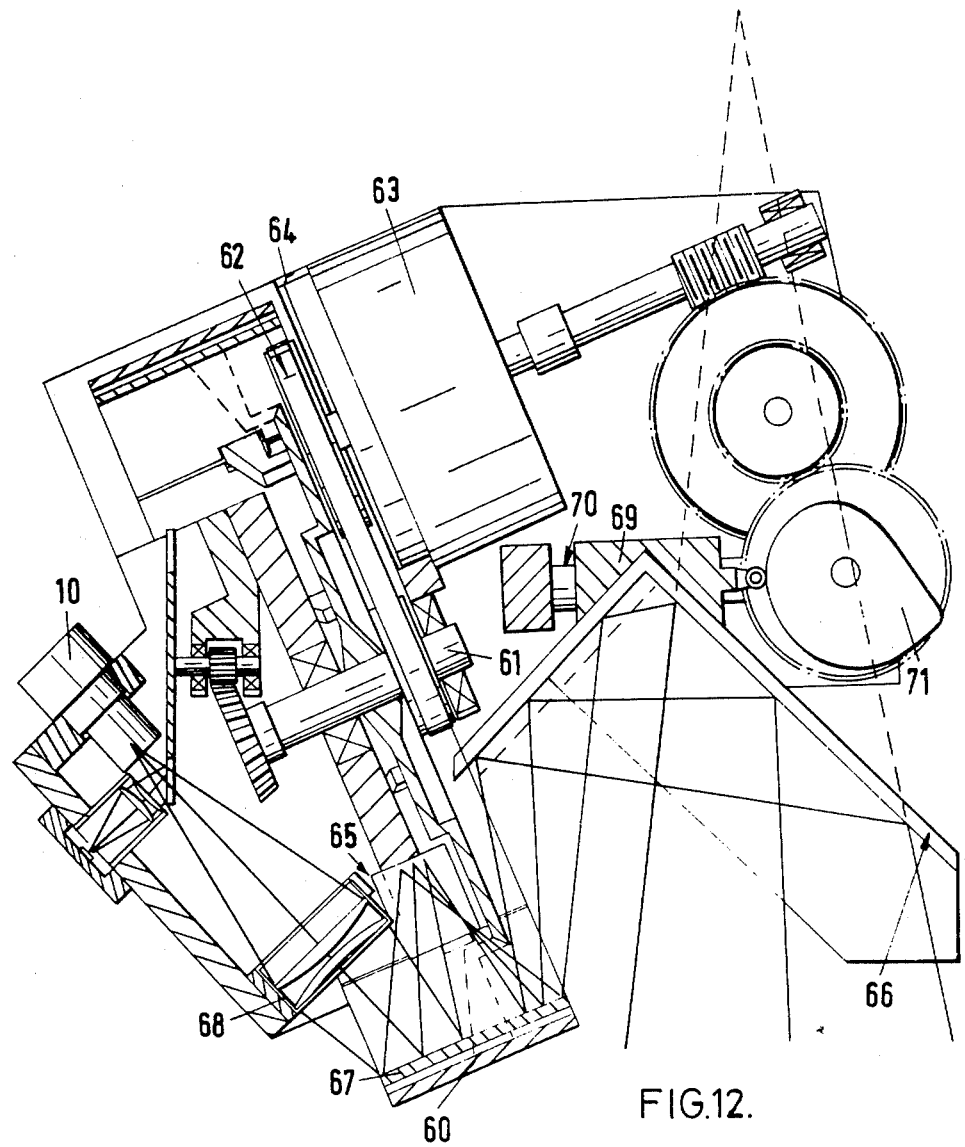

FIG. 12 is a detail view of a sixth embodiment.

The first embodiment of radiation scanner illustrated in the drawings comprises a detector 10 and a rotary assembly 11 by means of which radiation from an object 12 located in a field of view is scanned across the detector 10. The assembly 11 comprises a first drum 13 arranged to rotate about an axis 14 and formed by six planar mirrors 15 each of which is at a perpendicular distance $r_1$ from the axis 14; and a second drum 16 arranged to rotate about an axis 17 and formed by six externally reflective planar mirrors 18 each of which is at a perpendicular distance $r_2$ from the axis 17, the axes 14 and 17 being separated by a distance $d$.

Figure 2:
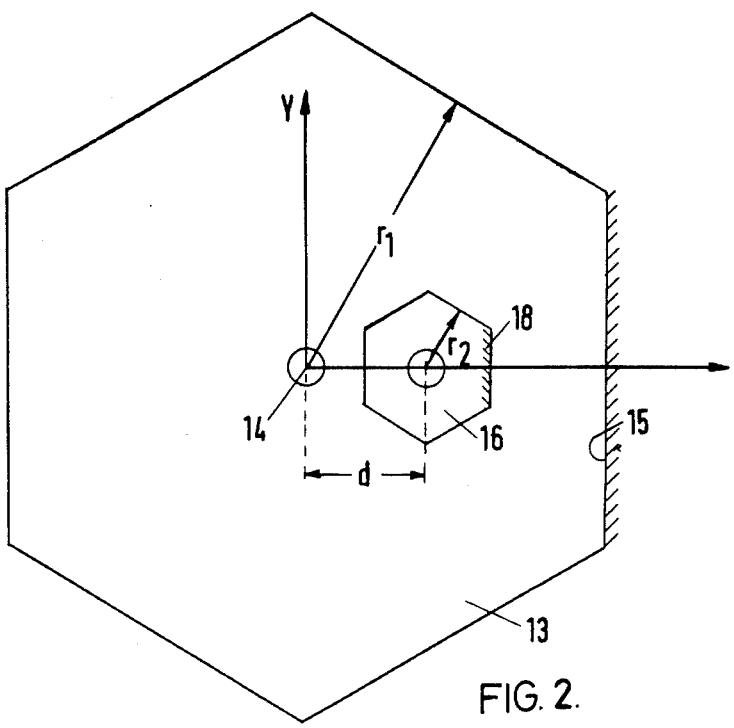
FIG. 2 is a plan view of FIG. 1.

It can be shown from theoretical considerations that for a specific arrangement of the components of this embodiment a telecentric and distortion-free scan can be achieved for synchronous rotation of the drums 13,16, the direction of rotation being the same for both drums. 'Telecentricity' is descriptive of radiation from an elementary field of view being presented to the detector at an angle which is independent of the position of field of view in the complete field of view. A telecentric scan is produced provided that the drums rotate synchronously, and additionally a distortion-free, flat field scan is produced if the algebraic equation is satisfied:

$$2d = r_1 - r_2$$

where the co-ordinate axes are as illustrated in FIG. 2. This is true for the region of the scan locus surrounding the point corresponding to the position of the drums for which the separation of the mirrors 15,18 is at a minimum and the mirrors are perpendicular to the plane containing the axes of rotation 14,17, said minimum distance being equal to $d$.

Figure 1:
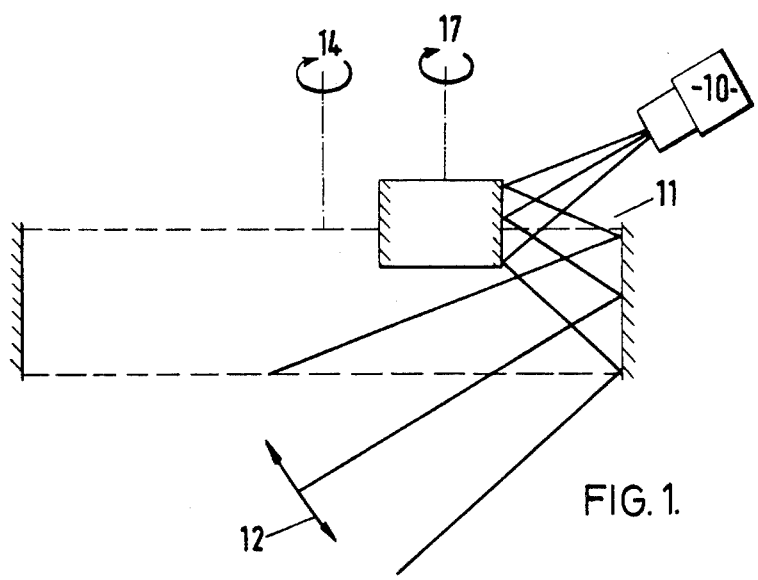
Figure 3:
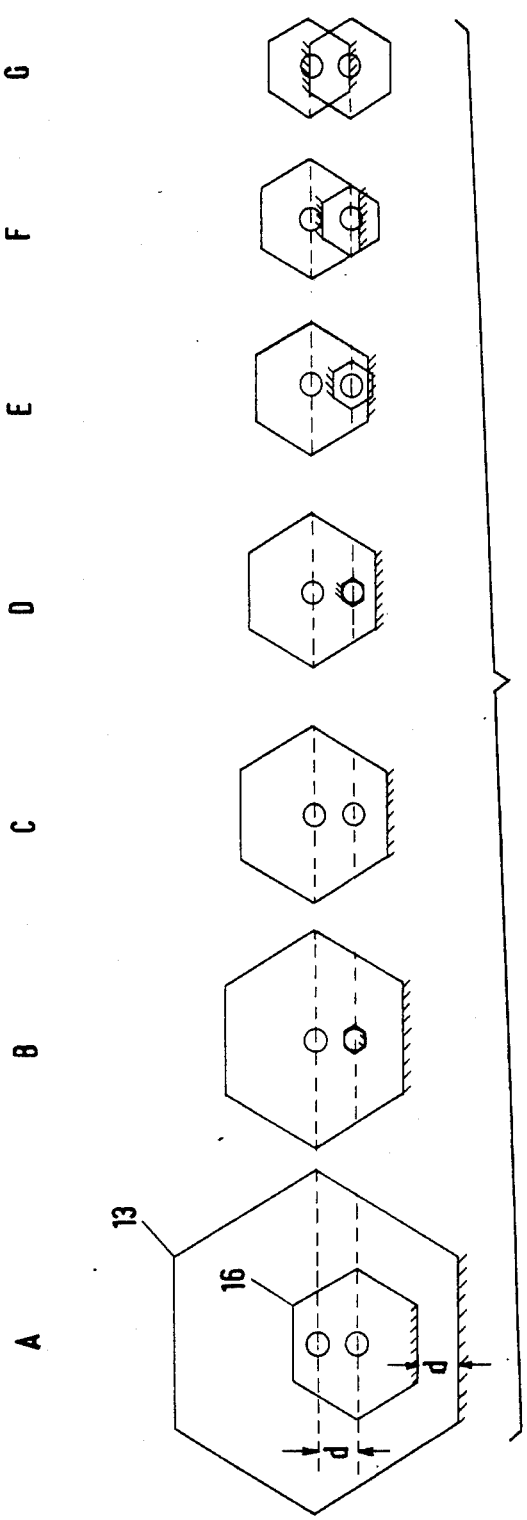
FIG. 3 is a diagram which is useful in understanding the principles underlying the present invention.

FIG. 3 shows seven different arrangements (A to G) of the rotary assembly wherein the foregoing criteria are satisfied. It will be noted that arrangement A of FIG. 3 is the arrangement described in detail with reference to FIGS. 1 and 2. The various arrangements A to G of FIG. 3 illustrate the relative sizes of the drums 13 and 16 as the size of the larger drum 13 is decreased. The axes of rotation of the two drums remaining spaced apart by the distance $d$. As the drum 13 reduces in size from arrangement A, through B to C the size of the drum 16 progressively reduces to zero diameter (arrangement C). Progressing again to arrangement D then through E, and F to G the smaller drum 13 becomes larger in size but the reflectors are arranged to be internally reflective in order that the criteria for distortion-free scanning can be achieved. Arrangement G depicts the situation where the drums 13 and 16 are of equal size.

With the arrangements of FIG. 3 the two drums are rotated synchronously so that corresponding mirrors on the drums remain parallel and telecentricity is assured.

Because the shape of the scan locus is independent of detector position the closeness of the detector 10 relative to the rotary assembly 11 is of no significance to telecentricity or distortion and so relay optics 20 may be used between the assembly 11 and the detector 10 as shown in FIGS. 4 and 5. In the particular case where the detector 10 is imaged onto the surface of the second mirror of the rotary assembly 11 good switching characteristics are obtained between successive scans because the period of time during which there is a confusion of scanned radiation at the real image of the detector is minimal.

A result of utilising relay optics 20 is that the arrangement C of FIG. 3 can form the basis of a practical scanner. In particular, telecentricity is achieved where the inner drum is reduced to an externally mirrored rod of minimal practical diameter onto which the detector 10 is imaged by relay optics 20. The optics 20 may be either reflective or refractive.

In the particular embodiment illustrated in FIG. 5 a drive shaft 21 driven by a drive motor (not shown) drives the outer drum 13 and, by way of a gear train, also drives the drum 16. The FIG. 5 embodiment also incorporates an optical imaging element 22 which images incident radiation onto the detector 10. In the event that the element 22 which may be either reflective or refractive is of relatively short focal length the cone of radiation which forms the image of a particular point in a field of view may pivot significantly as the field is scanned and this effectively means that the radiation entering the detector does so at a variable angle of incidence. Thus, 'telecentricity' is lost. To correct for this phenomenon a modified form of rotational assembly may be provided wherein the inner and outer drums have differing numbers of mirrors and are rotated at differing speeds. It can be shown that substantial telecentricity and distortion-free scanning is achieved provided that the location of the detector is related to the radial magnitude of the two drums, the spacing of the rotation axes and the ratio of the number of mirrors. If the detector is located at a distance $a$ from the axis 14 and the drum of radius $r_1$ has $n_1$ mirrors and the drum of radius $r_2$ has $n_2$ mirrors the required condition is:

$$2a[(n_1/n_2) - 1] + 2d[(n_1/n_2)]^2 + r_2[n_1/n_2]^2 = 2r_1[(n_1/n_2) - 1]^2$$

Returning to FIG. 3, arrangement G is such that the dimensions of the two drums are the same and they are both internally reflective, the reflective surfaces of one drum passing through the axis of rotation of the other drum. It can be shown that this arrangement can be simulated optically by the use of a roof reflecting arrangement, either in prism or mirror form located in a predetermined position within an internally-reflective drum. Specifically, the apex of the roof requires to be located at a distance of half the drum radius from the axis of rotation. Consequently, the two rotating drums described with reference to FIG. 3 can be replaced with only a single rotating drum in combination with a stationary reflector, the arrangement being such that radiation is twice reflected from the rotating drum during each scan. This arrangement is illustrated diagrammatically in FIG. 6 where a drum 30 which is rotatable about an axis 31 carries a plurality of planar mirrors 32. Radiation from a field of view 33 is reflected for a first time from a mirror 32 onto a stationary reflector 34 which is in the form of a pair of mirrors having their apex 35 lying parallel to the axis 31. After reflection from the reflector 34 the radiation is reflected for a second time from the same mirror 32 into the detector 10 which, to prevent obscuration, is imaged by relay optics 36 to a real image lying within the drum 30. The set of mirrors 32 effectively forms two sequences of reflective surfaces, the first sequence interrupting the radiation prior to reflection by the reflector 34 and the second sequence interrupting the radiation after reflection by the reflector 34.

A practical form of the embodiment of FIG. 6 is illustrated in FIG. 7 and comprises the drum 30 which is carried by a central hub 37 which is rotated by a belt drive 38. The detector 10, the relay optics 36 and the reflector 34 are all carried on a stationary frame 39 with the optics 36 being removable for the purpose of fitting lens systems of differing characteristics, such as is indicated at 36'. A chopper or blanking element 40 is arranged to intercept the radiation path to the detector 10 during those periods when there exists a confusion of scanned radiation, as described above. FIG. 7 also includes an imaging element 41.

In a modified arrangement of the system illustrated in FIG. 6 the drum is arranged to have two sets of planar mirrors arranged at different perpendicular distances from the axis of rotation of the drum. This is shown in FIG. 8 wherein incoming radiation is reflected from a mirror 42 forming part of a first set of mirrors onto the reflector 34 and onto a mirror 43 forming part of a second set of mirrors. Thereafter the scanned radiation is relayed to the detector 10 by optics 36. With this arrangement it is possible to simulate drums of different diameters which facilitate the construction of practical arrangements for folding of the radiation beam.

Telecentricity and distortion-free scanning is achieved when the roof of the roof reflecting arrangement is located at half the mean radius of the two sets of planar mirrors.

In all of the arrangements described above the radiation enters and leaves the rotary assembly in an oblique fashion with respect to the axis of rotation. If it is desired that the radiation enter and/or leave the rotary assembly either parallel to or perpendicular to the rotational axis each plane mirror may be replaced by a roof mirror or roof prism. One example of this arrangement is shown in FIG. 9 wherein the rotary assembly 50 comprises a first drum supporting a plurality of identical mirror pairs 51 arranged to form a roof mirror and a second drum supporting a plurality of identical mirror pairs 52 arranged to form a roof mirror. Radiation extending in the direction of the axis of rotation 54 is directed into the assembly 50 by a planar mirror 53 and passes into the detector 10 in a direction normal to the axis 54.

FIG. 10 is the prism equivalent arrangement of FIG. 9, the mirrored surface 53' being formed on a prism 53A, the mirror pairs 51' being formed on prisms 51A and the mirror pairs 52' being formed on prisms 52A. FIG. 11 shows an alternative arrangement of the prisms 51A and 52A which permits radiation to enter in the direction of the axis of rotation and to enter the detector 10 in a parallel direction.

All of the arrangements described above provide a scan of a field of view in one dimension only. To achieve a scan in a second dimension the arrangements of FIGS. 1 to 8 may be utilised in combination with a 'flapper' mirror. Alternatively a sliding corner cube element may be utilised as will be described with reference to FIG. 12 or in some cases it may be practical to angle successive mirrors with respect to the drum axis. The arrangements of FIGS. 9 and 10 will provide a distortion-free scan in a secondary direction such as is required for a banded scanner if successive mirror pairs or roof prisms on one of the drums are displaced in a direction parallel to the axes of rotation. This may also be done in the arrangement of FIG. 11, the movement for secondary scan taking place in a radial direction, but distortion occurs.

With reference to FIG. 12 the arrangement comprises a drum 60 which is rotated about a central hub 61 by a belt drive 62 coupled to the output shaft of a motor 63. The motor 63 is mounted on a stationary support 64 which carries a set of mirrors 65 forming a corner cube. Radiation entering the arrangement is reflected from a sliding corner cube 66 onto a mirror 67 forming part of the drum 60. After reflection from the mirror 67 and the mirror pair 65 the radiation enters the detector 10 by way of a relay lens system 68. To achieve scanning of the field of view in a second direction the sliding corner cube 66 is supported by a carrier 69 which is driven along a slideway 70 by means of cam and follower arrangement 71 which in turn is driven through a gearing system from the motor 63 and thus is held in synchronism with the primary scanning movement imparted by rotation of the drum 60.

The radiation scanners described above are of relatively simple mechanical construction and are capable of being driven at relatively high rotary speeds. The detector which is utilised will conveniently be in the form of a linear array of detector elements and the array may be arranged to lie parallel to or perpendicular to the direction of scan. In the event that the detector elements are scanned sequentially by the same part of prior to summation.

We claim:

1. Apparatus for use in a radiation scanning system comprising an objective device forming convergent radiation from a field of view, a radiation detector, and an optional scan means which is arranged to scan convergent radiation from said field of view across said detector, said scan means comprising a first drum which is rotatable about a first axis, a first set of optical members mounted on said first drum and defining a set of first planar reflective surfaces each of which extends perpendicular to a radius of said first drum, a second drum which is rotatable about a second axis extending parallel to and spaced from said first axis, a second set of optical members mounted on said second drum and defining a set of second planar reflective surfaces each of which extends perpendicular to a radius of said second drum, drive means rotating said first drum sequentially to move each of said first reflective surfaces through a first reflector station, and rotating said second drum sequentially to move each of said second reflective surfaces through a second reflector station, said scan means being arranged with the respective reflective surfaces when in said first and second reflector stations oppositely facing and the first and second reflector stations axially spaced, whereby convergent radiation from said field of view enters said detector after sequential reflection at said first and second reflector stations, said drums each having the same number of planar reflective surfaces and said drive means providing synchronous rotation of said drums, and the distance between said reflector stations in a plane perpendicular to said first and second axes being equal to the spacing between said axes in the same plane.

2. Apparatus for use in a radiation scanning system comprising an objective device forming convergent radiation from a field of view, a radiation detector, and an optional scan means which is arranged to scan convergent radiation from said field of view across said detector, said scan means comprising a first drum which is rotatable about a first axis, a first set of optical members mounted on said first drum and defining a set of first planar reflective surfaces each of which extends perpendicular to a radius of said first drum, a second drum which is rotatable about a second axis extending parallel to and spaced from said first axis, a second set of optical members mounted on said second drum and defining a set of second planar reflective surfaces each of which extends perpendicular to a radius of said second drum, drive means rotating said first drum sequentially to move each of said first reflective surfaces through a first reflector station, and rotating said second drum sequentially to move each of said second reflective surfaces through a second reflector station, said scan means being arranged with the respective reflective surfaces when in said first and second reflector stations oppositely facing and the first and second reflector stations axially spaced, whereby convergent radiation from said field of view enters said detector after sequential reflection at said first and second reflector stations, said first drum being an annular structure and said first set of optical members being mounted on the inner periphery thereof with said planar reflective surfaces inwardly facing.

3. Apparatus as claimed in claim 2, wherein said second set of optical members is mounted on the outer periphery of said second drum with said planar reflective surfaces outwardly facing.

4. Apparatus as claimed in claim 2, wherein said second drum is an annular structure and said second set of optical members is mounted on the inner periphery thereof with said planar reflective surfaces inwardly facing.

5. Apparatus as claimed in claim 3, wherein said objective device focusses said convergent radiation at said second reflector station, and a relay optic device is interposed between the second reflector station and said detector.

* * * * *